Dec. 3, 1968 S. J. POPEIL 3,414,030
SKIN CUTTER AND PEELER
Filed Oct. 4, 1965
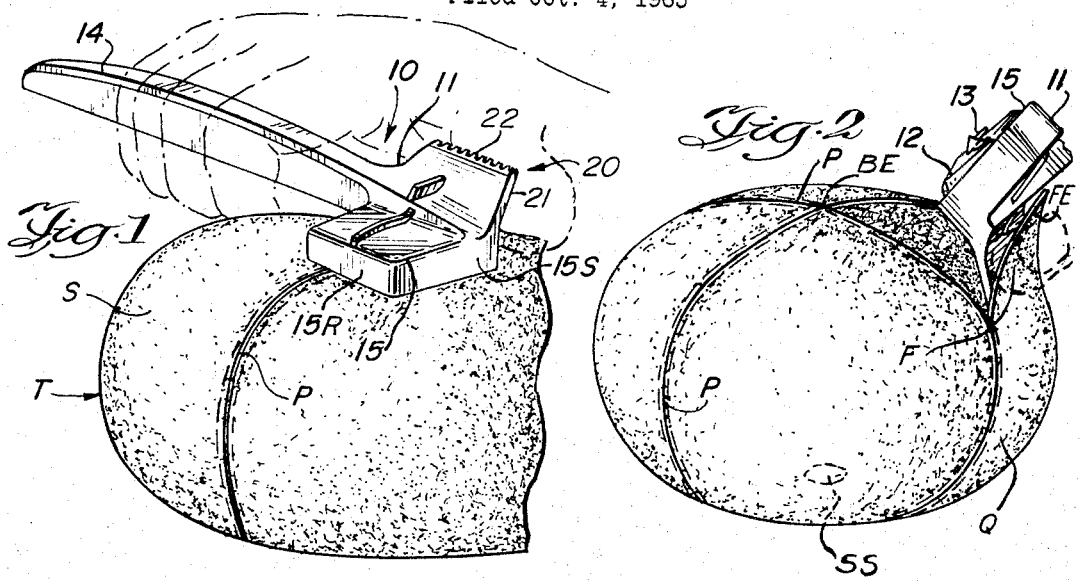
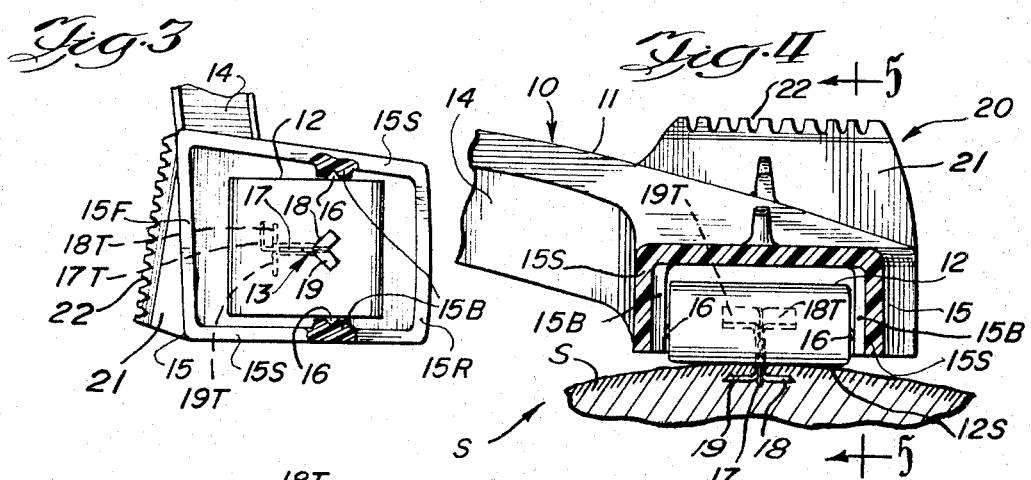
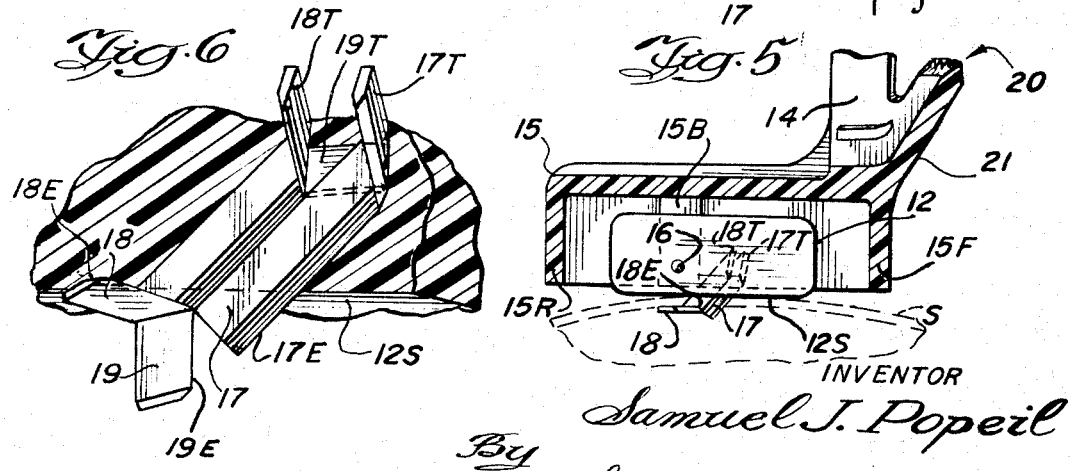
INVENTOR
Samuel J. Popeil
By
Dressler, Goldsmith, Clement, Gordon & Ladd
ATTORNEYS

United States Patent Office 3,414,030
Patented Dec. 3, 1968

3,414,030
SKIN CUTTER AND PEELER
Samuel J. Popeil, 2920 N. Commonwealth,
Chicago, Ill. 60657
Filed Oct. 4, 1965, Ser. No. 492,458
4 Claims. (Cl. 146—43)

ABSTRACT OF THE DISCLOSURE

A cutter for thin skinned produce is disclosed as comprising a one-piece holder having an elongated handle end and a hollow mounting head, a molded plastic support shoe pivotally carried in partly recessed position in the head to present a skin contacting surface and a cutter blade structure embedded in the head forwardly of its pivot axis and projecting through the skin contacting surface to present an array of cutting edges of T-shaped outline. The cutter includes a plow blade and skin lifting wing blades flanking the line of action and slightly to the rear of the plow blade. The wing blades are spaced from the shoe surface to provide clearance for the skin being cut and are beveled in opposed relation to the shoe surface to cause the pivoted shoe to follow the skin contour and insure a uniform depth of cut.

---

The present invention relates to a method and apparatus for peeling tomatoes, peaches, and other foodstuffs heretofor laboriously skinned with a paring knife.

With the advent of extensive insecticide treatment of foodstuffs and other chemical sprays, the skin of many produce items is contaminated to a danger point for persons with low tolerance to such toxicity. Others with skin allergies may find handling such contaminated foodstuffs irritating. This invention deals with solving both problems by permitting the peeling or skinning of the product swiftly and with a minimum of handling.

Peeling tomatoes and peaches, for example, has been done in the past by knife. Also, another known technique is to boil the foodstuffs for several minutes while submerged, remove and cool, and then slit the skin and peel it off. The disadvantage of this method stems from the undue time consumed, but more importantly, in that a partial cooking action takes place and the food loses its crisp, fresh taste and texture.

The method of the invention stems from the discovery that by uniformly undercuttingly slitting the skin in intersecting great circles, and then plunging the foodstuff for a short time into boiling water, the skin can be readily peeled without impairing the fresh characteristics of the food.

The device of the invention includes a blade and support shoe coordinated in a structure which permits slitting with a predetermined uniformity of cut. In addition, a serrated pressure peeler is conveniently positioned for the two-fold purpose of saw cutting the skin at stem portions, and permitting a grasping of the skin in a fashion that reduces tearing tendencies to a minimum.

The illustrative skin cutter tool to be described herein is characterized by a support shoe which presents a smooth skin contacting surface. The shoe carries a plow blade projecting through the contact surface and providing a forwardly directed skin cutting knife edge, with skin lifting wing baldes also carried by the shoe and located aft of the plow blade and flanking the line of action of its knife edges at a location spaced from but closer to the contact surface presented by the shoe. By bevelling the wing blades with the bevel opposed to the shoe, a self-leveling driving action is stimulated between the wings and the shoe to insure a uniformly deep cut.

The support shoe is a molded body with embedded plow blade and wing blades projecting downwardly from the shoe. The shoe is pivotally carried within a hollow head at one end of a handle to permit the blade to closely follow the contour of the surface while making the incision cut and thereby insure a uniform depth of cut.

Other features and advantages of the invention will be apparent from the following description and claims, and are illustrated in the accompanying drawings which show structure embodying features of the present invention and the principles thereof.

In the accompanying drawings forming a part of the specification, and in which like numerals are employed to designate like parts throughout the same, FIG. 1 is a perspective view illustrating the application of the tool for slitting the skin of a produce item such as a tomato;

FIG. 2 is a perspective view of the item shown fully slitted on two great circle paths and with the tool engaged for peeling off one of the loosened skin sections beginning at one of the corner regions;

FIG. 3 is a bottom plan view illustrating the mounting of the blade support shoe in the hollow head of the tool;

FIG. 4 is a transverse section through the rear of the head and illustrating the shoe and blade structure in rear elevations;

FIG. 5 is a longitudinal section taken adjacent a side region of the head and illustrating the shoe and blade structure in side elevation; and FIG. 6 is an enlarged fragmentary perspective and sectional view of the support shoe and blade structure.

Referring now to the drawings, one embodiment of a skin cutter and peeler tool as designated generally at 10 in FIG. 1 is shown being applied for slitting the skin S of a tomato T along a great circle path P. The invention has general application to produce items such as fresh fruits and vegetables and while the present disclosure relates to the skinning of tomatoes, other items such as peaches, pears, plums, avocados and onions and similar foodstuffs may be skinned in a similar fashion.

The method

In the practice of the method of this invention, a fresh tomato is slit on two great circle paths (FIG. 2) to divide the skin into approximately equal sections, each of which generally corresponds to a quadrant of a spherical surface.

The skin is cut completely through by slitting to a predetermined depth which slightly penetrates the body of the tomato. Along with cutting of the slit, the skin must be undercut along paths immediately bordering the slit so that border regions of each skin section are separated from the body of the tomato to facilitate entry of hot water between the body and the adjacent skin section during subsequent immersion.

One of the important advantages of this technique of slitting and undercutting the skin is that it enables immersion in hot water for as little as 5 to 15 seconds to effect widespread loosening of the skin enabling each section to be peeled, preferably beginning at a corner as illustrated in FIG. 2, progressively and completely from the body of the tomato. The short time required for immersion in hot water avoids impairment of the freshness of the product and enables skinning to be applied to fresh fruits and vegetables which are to be served as such.

The actual required time for immersion is a function of the ripeness of the tomato or other skin-covered foodstuff. With a fully ripened tomato, for example, the incision and flanking undercut are sufficient to induce peeling of a flap F large enough to support a complete separation of its adjacent skin quadrant Q. With a partially ripened tomato, 5 to 10 seconds of immersion in boiling water will sufficiently loosen the skin for peeling.

If the tomato is refrigerated, the immersion required of the method of the invention will not sufficiently heat the meat to require cooling to handle. Shortly after removal from the boiling water, the heat from the skin will dissipate into the cool interior meat. Only in the event the foodstuff is partially ripe is full immersion for 15 seconds required.

A further supplemental method step includes extending the incision perpendicular to the skin to be peeled a short distance beyond the flanking undercuts. Particularly with partially ripened foodstuffs, this additional incision permits the boiling water to more fully penetrate the flanking undercut and loosen the skin. Also with some foodstuffs, and particularly tomatoes, the stem scar portion SS (see FIG. 2) is more firmly rooted to the meat than is the skin at the blossom end. In peeling it becomes important to first undercut the skin at the blossom end BE before the flap F can be firmly engaged and peeled. In addition the skin scar portion of the tomato which is diametrically opposed to the blossom end requires additional undercutting.

It will be appreciated that the above method may be performed by hand with a paring knife, or a knife blade with flanking wings at its tip. Other devices capable of performing the method steps may also be envisioned.

The apparatus

The apparatus or cutting device of the present invention is constructed to perform the above method, but with a controlled depth and proportioning of the incision and undercut insured by a floating shoe guide. In addition, the stem scar and blossom end undercutting may be made by a serrated member which also serves as a skin flap grip to prevent tearing of the skin.

In greater detail the peeler 10, illustrative of the invention, is comprised of a holder 11 readily adaptable for one piece molding of plastic, and has a hollow end 15 which houses a pivotally mounted shoe 12. The T-shaped blade structure 13 is embedded in the shoe 12, and coacts with the shoe as the latter follows the contour of the foodstuff to form the incision and undercut to permit rapid peeling.

The holder 11 consists of an elongated handle portion 14 integrally merging at one end in a hollow head 15 having front, rear and side walls, 15F, 15R, and 15S, respectively, defining a generally rectangular mounting pocket in which the shoe 12 is pivotally rested. The side walls 15S have opposed inwardly directed bosses 15B (FIG. 3) inwardly indented to serve as bearing sockets mounting opposite integral projections 16 provided on the shoe 12. Thus, the shoe 12 is mounted with substantial clearance within the head to undergo free swinging movement about the pivot axis which is defined by the bosses 15B and the projections 16 and which extends generally perpendicular to the line of cutting.

The blade structure 13 includes a plow or lead blade 17 projecting through the smooth generally planar contact surface 12S of the support shoe and presenting a knife edge 17E (FIG. 6) angled obliquely to this surface and facing forwardly for initially cutting a slit through the skin of the tomato as the shoe is advanced in gliding contact along the exterior of the skin. Side by side wing blades 18 and 19 are disposed aft of and immediately adjacent the plow blade to flank the line of action of the knife edge 17E on the plow blade.

In the illustrative peeler, each of the blades is a separate element, all fixed in a predetermined spatial relationship by molding the same directly within the one piece molded body of the support shoe 12. For this purpose, each of the blades has an angled tab, 17T, 18T, and 19T at its upper end anchored in interlocking relationship with the molded body of the shoe. Each of the wing blades has its shank arranged substantially in a common plane with the shank of the plow blade so that the shanks of the wing blades move freely in a slit cut by the plow blade. Each of the wing blades presents a forwardly directed cutting edge, 18E and 19E, angling obliquely laterally from the direction of the slit and having a ground or beveled upper edge contour dynamically reacting to maintain the wing blades against the body of the tomato while performing their skin undercutting function along the skin margins bordering the slit.

The dynamic action referred to above will be more fully appreciated by reference to FIGS. 4 and 5. It will be seen that the wing blades 18, 19 ride beneath the skin. As the shoe 12 floats over the contour and is held firmly against the skin surface, the forward edge of the wings 18E, 19E will tend to dive or submarine because the blade bevel is on top of the wing blades 18, 19. The bevel as shown in FIG. 5, is ahead of the pivot pin 16. Therefore, the dynamic diving or sucking action of the wing blades will urge the forward portion of the shoe skin engaging face 12S into contact with the skin as the shoe floats around the generally curved contour of the skin. An ideal relationship is shown in FIG. 3 where the axis of the pivot portions 15 is in a plane which passes through the wing blades 18, 19 but behind the knife edge 17. Thus, the dynamic action of the blade and pivot of the shoe are coordinated to insure an even and uniform depth of cut over irregular rounded surfaces.

In a successful commercial embodiment, each of the blades 17, 18 and 19 is of hardened steel stock of 0.010 inch thickness. The wing blades 18 and 19 are spaced about 0.050 inch from the contact surface of the shoe to provide sufficient clearance for preventing bunching of the skin being undercut, without, however, gouging the body of the tomato. As is apparent from the drawings, the wing blades 18 and 19 are located within the maximum projection of the plow blade 17 from the contact surface 12S of the shoe.

The serrated pressure peeler 20 includes a thumb pressure plate 21 and a plurality of uniform teeth along its top edge. The teeth are proportioned to permit a sawing action at the stem scar SS and blossom ends BE to start a larger undercut than that provided by the cutter blade at the intersections of the paths P. Thereafter, the thumb pressure plate 21 is inserted beneath the flap end FE (see FIG. 2) and the thumb or finger placed over the flap end to hold it on the pressure plate. By grasping a substantial portion of the flap in this manner, the tension required to strip the balance of the skin is distributed over a larger cross section and any tendency to tear thereby is reduced. It will be noted particularly in FIG. 1 that the pressure peeler 20 with the serrated teeth 22 is oriented in a plane generally parallel with the long axis of the handle 14, thereby placing it in a convenient position for peeling the flap as shown in FIG. 2.

In a modified alternative construction (not shown), the shoe 12 is formed of two pieces which mate at an interface in which the blades 17, 18, 19 are locked. A pair of projections, molded in the shoe at the pivot axis, are snap-actingly inserted in sockets in the bosses 15B. In the modified construction the relationships between the shoe face 12S and blades 17, 18, 19 as well as the pivot axis are maintained just as in the embodiment shown in the drawings and described in detail above.

Thus, while preferred constructional features of the invention are embodied in the structure illustrated herein, it is to be understood that changes and variations may be made by those skilled in the art without departing from the spirit and scope of the appended claims.

What is claimed is:

1. A skin cutter comprising a one piece holder having an elongated handle terminating in a hollow head, a support shoe comprising a solid body of molded plastic material pivotally carried in partly recessed relation in said head and providing a skin contacting surface, and cutter blade structure projecting through said surface and presenting cutting edges of generally T-shaped elevational outline configuration, said blade structure including a plow blade embedded in said shoe and projecting therefrom to present a forwardly directed skin cutting knife edge extending a predetermined distance from said surface and skin lifting wing blades having side by side shanks embedded in said shoe immediately aft of and aligned with the plow blade, said wing blades extending laterally to flank the line of cutting action of the plow blade at a location within the maximum projection of the plow blade and spaced from said surface, the support shoe being pivoted on an axis generally aft of the plow blade and wing blades.

2. A skin cutter comprising a handle, a support shoe carried from said handle and provided with a skin contacting surface, a plow blade carried by and projecting from the shoe and presenting a forwardly directed skin cutting knife edge extending more than 0.050 inch from said surface and skin lifting wing blades carried by the shoe and located aft of and flanking the line of action of the knife edge at a location spaced about 0.050 inch from said surface, said handle carrying a thumb pressure plate extending therefrom in the general plane thereof and a plurality of teeth at the end of the thumb pressure plate.

3. A skin cutter comprising a one piece holder having an elongated handle terminating in a hollow head, a support shoe comprising a solid body of molded plastic material pivotally carried in partly recessed relation in said head and providing a skin contacting surface, and cutter blade structure projecting through said surface and presenting cutting edges forwardly of the pivot axis for the shoe and of generally T-shaped elevational outline configuration, said blade structure including a plow blade projecting a predetermined distance from said surface and wing blades trailing the plow blade and flanking the line of action thereof at a location within the maximum projection of the plow blade and spaced from said surface a distance greater than the thickness of each wing blade.

4. A skin cutter comprising a holder having means defining a pivot axis, a support shoe carried from said holder to pivot about said axis and presenting a smooth skin contacting surface, and cutter blade structure projecting through said surface and presenting cutting edges forwardly of said axis and of generally T-shaped elevational outline configuration, said blade structure including a plow blade projecting a predetermined distance from said surface and wing blades trailing the plow blade and flanking the line of action thereof at a location within the maximum projection of the plow blade and spaced from said surface a distance greater than the thickness of each wing blade, said holder carrying a thumb pressure plate extending therefrom in the general plane thereof and a plurality of teeth at the end of the thumb pressure plate.

References Cited

UNITED STATES PATENTS

| 1,984,709 | 12/1934 | Taylor | 146—3 X |
| 2,549,326 | 4/1951 | Moore | 30—24 |

FOREIGN PATENTS

| 819,137 | 10/1951 | Germany. |
| 737,894 | 10/1955 | Great Britain. |

W. GRAYDON ABERCROMBIE, *Primary Examiner.*